United States Patent [19]

Kiritani et al.

[11] E Patent Number: Re. 33,113

[45] Reissued Date of Patent: Nov. 14, 1989

[54] PRESSURE SENSITIVE RECORDING PAPER

[75] Inventors: Masataka Kiritani; Hiroharu Matsukawa, both of Fujinomiya; Masayuki Aoki, Ashigara, all of Japan

[73] Assignee: Fuji Photo Film Co., Ltd., Kanagawa, Japan

[21] Appl. No.: 724,186

[22] Filed: Sep. 17, 1976

Related U.S. Patent Documents

Reissue of:

[64] Patent No.: 3,836,383
Issued: Sep. 17, 1974
Appl. No.: 193,151
Filed: Oct. 27, 1971

[30] Foreign Application Priority Data

Oct. 27, 1970 [JP] Japan ..... 45-94877

[51] Int. Cl.[4] ..... B41M 5/16; B41M 5/22

[52] U.S. Cl. ..... 503/213; 428/199; 428/402.2; 428/914; 503/200; 503/215

[58] Field of Search ..... 427/153; 346/135.1, 346/136, 207; 428/195, 199, 321.1, 321.5, 914, 402.2; 503/200, 207, 213, 215; 570/199; 549/225; 8/513, 616; 546/15

[56] References Cited

U.S. PATENT DOCUMENTS

| | | | |
|---|---|---|---|
| 3,009,760 | 11/1961 | Lenz | 8/513 |
| 3,016,308 | 1/1962 | MacAulay | 503/200 |
| 3,069,478 | 12/1962 | McLaughlin | 570/199 |
| 3,625,736 | 12/1971 | Matsukawa | 503/207 |
| 3,627,581 | 12/1971 | Phillips | 428/402.2 X |
| 3,649,649 | 3/1972 | Orita et al. | 549/225 |
| 3,936,566 | 2/1976 | Sato et al. | 503/213 |

FOREIGN PATENT DOCUMENTS 915342 1/1963 United Kingdom .

*Primary Examiner*—Thomas J. Herbert
*Attorney, Agent, or Firm*—Sughrue, Mion, Zinn, Macpeak, and Seas

[57] ABSTRACT

A pressure-sensitive recording paper comprising a support having coated thereon a layer of color former, said color former dissolved in at least one compound represented by the following formula:

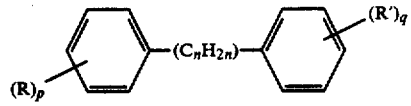

(I)

wherein n is an integer of 1 to 8, R and R′ each represent a member selected from the group consisting of alkyl groups containing one to eight carbon atoms, and a hydrogen atom, p and q represent the number of alkyl groups, p+q being an integer of 1 to 3, and R and R′ may be the same.

7 Claims, No Drawings

PRESSURE SENSITIVE RECORDING PAPER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a pressure-sensitive recording paper. More particularly, it relates to a pressure-sensitive recording paper using a compound, in which two alkyl-substituted benzene nuclei are connected with each other through the unit $\leftarrow C_nH_{2n}\rightarrow$, as a solvent for a color former:

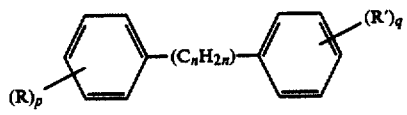

(I)

wherein n is an integer of from 1 to 8, R and R′ each is an alkyl group having one to eight carbon atoms or a hydrogen atom, p and q each is the number of alkyl groups, p+q being an integer of 1–3, and wherein R and R′ may be the same.

2. Description of the Prior Art

The object of the present invention is to obtain a pressure-sensitive recording paper having no unpleasant smell and toxicity, and capable of forming a color image having a higher density without giving a color fog.

Usually, as pressure-sensitive recording paper, there are those comprising so-called upper paper prepared by dissolving a substantially colorless compound (hereinafter referred to as a "color former") in an organic solvent, encapsulating it, and then coating the capsules onto a support; lower paper prepared by coating a color-developing material (hereinafter referred to as a "color developer"), which is capable of forming colored images, onto another support; and, in some cases, middle paper prepared by coating capsules containing a color former onto one side of a support and a color developer onto the other side thereof, or those containing said capsules and a color developer onto the same side of a support.

In the case of the combination of upper and lower paper, or upper, middle and lower paper, color is developed by locally pressing in such a way that the capsule layer comes into contact with the color developer layer to decompose the capsules located at the pressed part and to cause reaction between the color former and the color developer. When a pressure sensitive recording paper having capsules and a color developer agent on the same surface thereof is used, color will be developed by pressing in the same way. As the color developer, active clay materials, such as acid clay, active zeolite and bentonite, or organic acidic materials, such as succinic acid, tannic acid, gallic acid, pentachlorphenol and phenol resin are generally used. As a color former for a pressure sensitive recording paper, malachite green lactone, benzoyl leucomethylene blue, crystal violet lactone, rhodamine B lactom, 3-dialkylamino-7-alkylfluorans, 3-methyl-2,2′-spirobi(benzo[f]chromene), etc. are used.

The conditions a solvent dissolving a color former for pressure sensitive recording paper should satisfy are:

a. to have enough solubility to dissolve a necessary amount of color former,
b. to have a high boiling point so as not to vaporize in a heat-drying process and in a place of elevated temperature,
c. not to be eluted on encapsulation,
d. not to desensitize or prevent the color formation on the lower paper,
e. not to provide changes, such as decomposition of the color former, color formation, etc.,
f. to have a low viscosity so that the effusion thereof from inside the capsules can be freely done on breakage of the capsules, and to have a small rise in viscosity, even at low temperature,
g. to have no unpleasant smell,
h. to have little toxicity to human beings and animals, and the like. Among these, conditions (a)–(e) are especially of importance and, if one of these conditions is not satisfied, the solvent cannot be used as a solvent for a color former.

In fact, however, solvents satisfying conditions of said (a)–(h) have so far not been found. Therefore, as things are, those prepared by mixing several kinds of solvents in a suitable ratio are used.

That is, ethers do not satisfy the conditions of (a) and (d), alcohols do not satisfy the conditions of (a), (c) and (d), parafins do not satisfy the conditions of (a), ketones, esters, olefins and amines do not satisfy the conditions of (d), and organic acids to not satisfy the conditions of (c), and usual aromatic hydrocarbons do not satisfy the conditions of (a), (g) and (h). Chlorinated diphenyl now used as a solvent for pressure sensitive recording paper, nearly satisfies the conditions of (a) to (e). It has, however, defects in that, at a low chlorination degree, it has a peculiar unpleasant smell, while it has low viscosity and that, at high chlorination degree, it has high viscosity, and does not have much of an unpleasant smell. That is, the viscosities of low chlorinated trichlorodiphenyl and tetrachlorodiphenyl are comparatively low. However, they have a peculiar unpleasant smell. Highly chlorinated pentachlorodiphenyl and hexachlorodiphenyl have considerably reduced unpleasant smell, but their viscosity conspicuously increases on the other hand. Hexachlorodiphenyl has no fluidity at a room temperature. Therefore, the pressure-sensitive recording paper wherein low chlorinated trichlorodiphenyl and tetrachlorodiphenyl are used, has the defect of having an unpleasant smell. The pressure sensitive recording paper wherein highly chlorinated pentachlorodiphenyl and hexachlorodiphenyl are used, has the defect in that the effusion thereof is difficult to be freely done due to their high viscosity and that sufficient color density cannot be obtained, while they have less of an unpleasant smell. The pressure-sensitive recording paper wherein the mixture of chlorinated diphenyl with a low chlorination degree and the same with high chlorination degree is used, is a little more improved in the smell than that wherein chlorinated diphenyl with low chlorination degree is used separately and, in the density of the color formed, the former is a little more improved than that wherein highly chlorinated diphenyl is used independently, but the former has still considerable unpleasant smell and the density of color formed is not sufficient. In addition, chlorinated diphenyl is slightly decomposed by light to form hydrogen chloride. Accordingly, the capsule coated sheet wherein chlorinated diphenyl is used has the defect that, when it is exposed to light for a long time, the generated hydrogen chloride will be reacted with the color former to cause colored fog. Furthermore, this capsule coated sheet wherein the colored fog took place has less color developing ability onto the lower paper, and a sufficient density of the color formed cannot be obtained. Besides, chlorinated diphenyl has appreciable toxicity to human beings and animals. Therefore, the conventional pressure sensitive recording paper wherein chlorinated diphenyl is used, has had the defects that it has unpleasant smell, that sufficient density of the color formed cannot be obtained, that when exposed to light for a long time, colored fog on capsule coated sheet and the lowering of the color developing ability thereof to the lower paper take place, and that it has a problem in its toxicity.

SUMMARY OF THE INVENTION

We, the inventors, as the result of many investigations concerning these kind of solvents, have found that the specific compound represented by the general formula I has properties which are quite adequate for our purpose, and accomplished this invention. That is, the present invention is characterized in that, in the pressure sensitive recording paper, the compound represented by the general formula (I) is used as a solvent for the color former, separately or in combination with other solvents.

The compound (I) in this invention is characterized in that two alkyl substituted benzene nuclei are connected with each other through a $-C_nH_{2n})$ bond and, as is different from the usual aromatic compounds, the compound (I) of the present invention has a considerably high boiling point, does not vaporize off in a heat drying process or in a place of the elevated temperature, has no unpleasant smell, and in addition, it has no toxicity to human beings and animals.

DETAILED DESCRIPTION OF THE INVENTION

The reason why p+q in the compound (I) used in the present invention is restricted to not more than 3, is that, when p+q is not less than 4, the viscosity thereof conspicuously increases or the compound becomes solid, which is not desirable.

The reason why the number of the carbon atoms contained in R and R', and that in the $\leftarrow C_nH_{2n}\rightarrow$ existing between the two benzene nuclei is not more than 8 and 8, respectively, is that, when the number of the carbon atoms contained in R and R' becomes not less than 9 and n becomes not less than 9, the viscosity thereof conspicuously increases and the solubility of a color former thereto decreases, which is not desirable.

The compound of this invention having a particularly restricted structure, satisfies the aforesaid conditions of (a)–(e) demanded for a solvent for the color former of pressure sensitive recording paper. In addition, it has the excellent advantages that there is little rise in viscosity, even at a low temperature, that it has no unpleasant smell or toxicity to human beings and animals, that it raises the stability of the capsule coated sheet to light, that, even when the capsule coated sheet is exposed to light for a long time, the colored fog of the sheet is remarkably less compared with conventional ones, that the color developing ability in developing this capsule coated sheet onto the lower paper does not decrease like the conventional ones, and the like. The pressure sensitive recording paper of this invention is excellent also in that it has a higher density with respect to the color formed compared with conventional pressure sensitive recording paper, wherein chlorinated diphenyl is used. Therefore, it can be said that the compound (I) used in the present invention having a particularly restricted structure is extremely excellent as a solvent for a color former of pressure sensitive recording paper.

The compound of the general formula (I) of the present invention may be used in combination with other solvents. As solvents to be mixed together, there are petroleum fractions such as liquid paraffin, kerosene, naphtha, etc., synthesized oils, such as chlorinated paraffin, chlorinated diphenyl, hexahydroterphenyl, alkylnaphthalenes, alkylated polyphenyls, etc., and vegetable oils, such as cotton seed oil, linseed oil, etc. These solvents are mixed and used together in order to adjust the viscosity, to control the solubility of a color former, and to increase the quantity for the reduction of cost, etc.

This invention is characterized by using the compound of the general formula (I) having a particularly restricted structure as a solvent for a color former of pressure sensitive recording paper and, accordingly, all of the publicly known art can be applied as a method or process for encapsulating this solvent. Therefore, the present invention is not restricted by the method or process for the encapsulation.

The present invention will be further explained by the following Examples, which are merely illustrative and not limitative of the present invention.

In the examples of the present invention, there is used as a clay paper (lower paper) prepared as follows. That is, 100 g of sulfuric acid processed acidic terre abla was dispersed in 280 g of water containing 6 g of 40 percent sodium hydroxide aqueous solution using homogenizer. Thereafter, 50 g of a 10 percent aqueous solution of sodium salt of casein and 30 g of a styrene butadiene latex (trade name: Dow Latex 626, made by Dow Chemical Co.), were added thereto as a binder, and coated on a paper by air knife coating, and dried to obtain the clayed paper.

EXAMPLE 1

To 100 g of 2,4-dimethyldiphenylmethane obtained by the reaction between meta-xylene and benzyl chloride, having the following formula (b.p. 295°-296° C/760 mmHg, specific gravity ($D_4^{20}$) 0.9951);

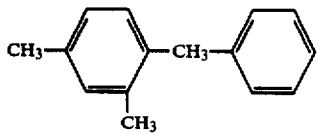

was dissolved 3 g of crystal violet lactone. The resulting solution was then added to a solution of 20 g of gum arabic and 160 g of water to emulsify. Thereafter, 20 g of acid processed gelatin and 160 g of water were added thereto and the pH thereof was reduced to 5 by the addition of acetic acid under constant stirring. 500 g of water was then added to cause coacervation. On coacervation, a dense liquid membrane of gelatin-gum arabic was formed around the oil droplets containing a color former. The pH was further reduced to 4.4, and 4 g of 37 percent formation was successively added for hardening the membrane. Said operation was carried out keeping the temperature of the system at a temperature of 50° C. Then the system was cooled to 10° C in order to gel the dense liquid membrane. Furthermore, in order to raise the effect of hardening, the pH thereof was raised to 9 and the system was allowed to stand for several hours to accomplish the encapsulation. The capsule solution thus obtained was coated on a sheet of paper by air knife coating, then dried. The pressure sensitive recording paper thus obtained had no unpleasant smell like that of the conventional pressure sensitive recording paper wherein chlorinated diphenyl was used as a solvent. When this paper (upper paper) was superposed on a clay paper (aforesaid lower paper coated with active clay substance) and writing was conducted with pressure, there was developed a blue image on a clayed paper in an instant. The density of this color developed image was remarkably high compared with that of the conventional pressure sensitive recording paper. In addition, even when this upper paper was exposed to sun light for a long time, the lowering in the color developing ability and colored fog were not recognized.

EXAMPLE 2

3 g of rhodamine B lactam was dissolved in 100 g of 2,5-dimethyldiphenylmethane obtained by the reaction between para-xylene and benzyl chloride, having the following formula (b.p. 293.5°-294.5° C/760 mmHg, specific gravity ($D_4^{20}$) 0.9950);

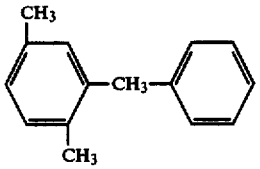

and treated in the same manner as in Example 1 to obtain upper paper. The upper paper thus obtained had no unpleasant smell like that of the conventional pressure sensitive recording paper. When this upper paper was superposed on a clay paper and writing was conducted with pressure, there was developed red image on a clay paper in a moment. The density of color developed image was remarkably high compared with that of the conventional recording paper wherein chlorinated diphenyl was used. Besides, even when this upper paper was exposed to sun light for a long time, the lowering in the color developing ability and fog were not observed.

EXAMPLE 3

2 g of 3-diethylamino-7-methylfluoran was dissolved in a mixture of 80 g of octadecyldiphenylmethane having the following structure (mixture of several kinds of isomers, b.p. 232°-244° C/10 mmHg);

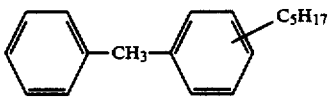

and 20 g of paraffin containing 10–12 carbon atoms, treated in the same was as in Example 1 to obtain upper paper. The upper paper for pressure sensitive recording paper thus obtained had no unpleasant smell like that of the conventional pressure sensitive recording paper prepared by the analogous treatment using chlorinated diphenyl. When this upper paper was superposed on a clay paper and writing was conducted with pressure, there was developed a red image on a clay paper. The density of this color developed image was remarkably high compared with that of the conventional pressure sensitive recording paper wherein chlorinated diphenyl was used. In addition, even when this upper paper was exposed to sun light for a long time, the lowering in the color developing ability and colored fog were not observed.

EXAMPLE 4

3 g of 3-diethylamino-7-dibenzylaminofluoran was dissolved in a mixed oil of 70 g of a mixture of dimethyldiphenylmethane and ethyl-diphenylmethane having a specific gravity of 0.984 at 25° C, a viscosity of 2.27 centistokes at 50° C and a refractive index of 1.5684 at 20° C.

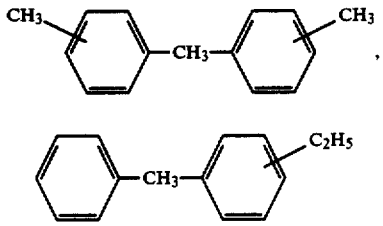

and 30 g of isoparaffin containing 12 - 14 carbon atoms, treated in the same way as in Example 1 to obtain upper paper. This upper paper had no unpleasant smell like that of the conventional pressure sensitive recording paper wherein chlorinated diphenyl was used. When this upper paper was superposed on a clay paper and writing was done with pressure, there was developed a blackish green image on a clay paper. The density of this color developed image was remarkably high compared with that of the conventional pressure sensitive recording paper wherein chlorinated diphenyl was used. In addition, even when this upper paper was exposed to sun light for a long time, the lowering in the color developing ability and colored fog were not observed.

EXAMPLE 5

0.2 g of 3-diethylamino-7-diethylaminofluoran was dissolved in 20 g of 1,1-di-p-toluylethane (having a melting point lower than 20° C and a boiling point of 295°-300° C/760 mmHg) represented by the following structure:

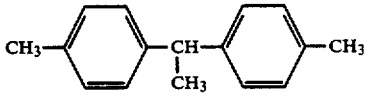

and to this were added 5 g of toluylenediisocyanate and 10 g of methylene chloride containing 3 g of bisphenol A to prepare a first solution. Thereafter, 3 g of polyvinyl alcohol was dissolved in 25 g of water, and to this was added said first solution under vigorous stirring to emulsify. The resulting emulsion was poured into 150 g of water kept at 50° C, and the temperature of the system was raised to 80° C under stirring. The system was maintained at this temperature for 30 minutes to cause polymerization between the toluylenediisocyanate and bisphenol A on the surface of the oil droplets to form a capsule wall, whereby encapsulation was accomplished. The capsule solution thus obtained was coated on a paper by way of roll coating, then dried. The upper paper obtained in this way did not have the unpleasant smell like that of the conventional pressure sensitive recording paper obtained by the analogous treatment using chlorinated diphenyl. When this upper paper was superposed on a clay paper and writing was conducted, there was developed a blackish green image on a clay paper. The density of this color developed image was remarkably high compared with that of the conventional pressure sensitive recording paper wherein chlorinated diphenyl was used. Furthermore, even when this upper paper was exposed to sun light for a long time, the lowering in the color developing ability and colored fog were not observed.

EXAMPLE 6

Example 1 was duplicated using 2-methyl-5-isopropyldiphenylmethane (having a boiling point of 307°-310° C and specific gravity of 0.9916 at 20° C) instead of 2,4-dimethyldiphenylmethane, and using 3-methyl-2,2'-spirobi(benzo[f]chromene) instead of crystal violet lactone. The result thereof was the same as in Example 1.

[EXAMPLE 7]

[Example 1 was duplicated, except that 1,1-diphenyl-1-heptylmethane (having a boiling point of 143°-145° C/0.1 mmHg, a melting point of −5 to −4° C and a specific gravity of 0.9444 at 20° C)]

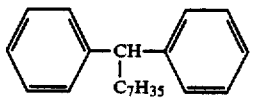

[was used instead of 2,4-dimethyldiphenylmethane. The result thereof was the same as in Example 1.]

EXAMPLE [8] 7

Example 1 was duplicated, except that 1,2-bis-tolylethane (having a boiling point of 290°-340° C and a specific gravity of 0.968 (25° C), viscosity 3.2 cp (50° C) was used instead of 2,4-dimethyldiphenylmethane.

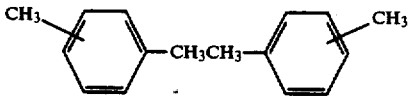

The result thereof was the same as in Example 1.

EXAMPLE [9] 8

Example 1 was duplicated, except that dimethyl-t-butyldiphenylmethane (mixture of several kinds of isomers, having a boiling point of 132°-148° C/0.1 mmHg) was used instead of 2,4-dimethyldiphenylmethane, and the same result as in Example 1 was obtained.

Although the present invention has been adequately set forth in the foregoing specification and Examples included therein, it is readily apparent that various changes and modifications can be made without departing from the spirit and scope thereof.

What is claimed is:

1. A pressure sensitive recording paper comprising a support having coated thereon a layer of color former, said color former dissolved in at least one compound represented by the following formula:

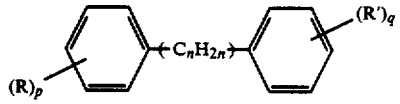

wherein n is an integer of 1 to 8, R and R' each represent a member selected from the group consisting of alkyl groups containing one to eight carbon atoms, and a hydrogen atom, p and q represent the number of alkyl groups, p+q being an integer of 1 to 3, and R and R' may be the same.

2. The pressure sensitive recording paper as claimed in claim 1, wherein said compound is a member selected from the group consisting of:

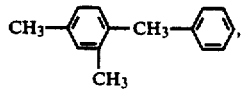

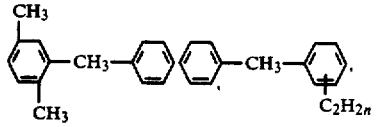

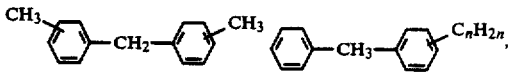

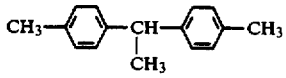

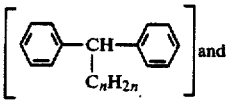

and

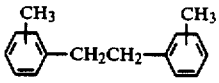

3. The pressure sensitive recording paper of claim 1, wherein said compound is used as a mixture with a solvent selected from the group consisting of a petroleum fraction, a synthetic oil and a plant oil.

4. The pressure sensitive recording paper of claim 1, wherein said color former and said compound are contained in microcapsules.

5. The pressure sensitive recording paper of claim 3, wherein said petroleum fraction is a member selected from the group consisting of liquid paraffin, kerosene and naphtha.

6. The pressure sensitive recording paper of claim 3, wherein said synthetic oil is a member selected from the group consisting of chlorinated paraffin, chlorinated diphenyl, hexahydroterphenyl, alkylnaphthalenes and alkylated polyphenyls.

7. The pressure sensitive recording paper of claim 3, wherein said plant oil is a member selected from the group consisting of cottonseed oil and linseed oil.

* * * * *